United States Patent
Zhang et al.

(10) Patent No.: US 10,276,216 B2
(45) Date of Patent: Apr. 30, 2019

(54) DATA STORAGE DEVICE FILTER

(71) Applicant: Seagate Technology LLC, Cupertino, CA (US)

(72) Inventors: Lihong Maruti Zhang, Singapore (SG); Xiong Liu, Singapore (SG); Hao Sun, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 13 days.

(21) Appl. No.: 15/704,492

(22) Filed: Sep. 14, 2017

(65) Prior Publication Data

US 2019/0080724 A1 Mar. 14, 2019

(51) Int. Cl.
*G11B 33/14* (2006.01)
*B01D 46/00* (2006.01)

(52) U.S. Cl.
CPC ...... *G11B 33/1453* (2013.01); *B01D 46/0023* (2013.01); *B01D 46/0031* (2013.01); *G11B 33/14* (2013.01); *G11B 33/146* (2013.01)

(58) Field of Classification Search
CPC ... G11B 33/14; G11B 33/1453; G11B 33/146; B01D 46/0023; B01D 46/0031
USPC .................. 360/97.12, 97.16, 97.17; 55/486
See application file for complete search history.

(56) References Cited

U.S. PATENT DOCUMENTS

| | | | |
|---|---|---|---|
| 5,229,899 A | 7/1993 | Brown et al. | |
| 5,367,417 A | 11/1994 | Brown et al. | |
| 5,590,001 A | 12/1996 | Ino et al. | |
| 5,666,950 A * | 9/1997 | Smith | A61M 16/0465 128/201.13 |
| 6,093,230 A | 7/2000 | Johnson, III et al. | |
| 6,146,446 A | 11/2000 | Tuma et al. | |
| 6,196,708 B1 * | 3/2001 | Rogers | B01D 39/1692 362/547 |
| 6,214,070 B1 | 4/2001 | Crowder et al. | |
| 6,972,927 B2 | 12/2005 | Hong et al. | |
| 7,306,659 B2 | 12/2007 | Gorton et al. | |
| 7,420,771 B1 | 9/2008 | Hanke et al. | |
| 8,585,793 B2 * | 11/2013 | Bishop | G11B 33/146 55/486 |
| 8,867,164 B2 | 10/2014 | Brown | |
| 9,126,127 B2 * | 9/2015 | Jablonski | B01D 17/0202 |
| 9,254,455 B2 * | 2/2016 | Bai | B01D 39/1623 |
| 9,771,675 B2 * | 9/2017 | Altshuler | B32B 5/022 |
| 2004/0168575 A1 * | 9/2004 | Isogawa | B01D 46/0032 96/134 |
| 2006/0032372 A1 * | 2/2006 | Dauber | B01D 46/0032 95/90 |
| 2006/0242933 A1 * | 11/2006 | Webb | B01D 39/1615 55/486 |
| 2007/0230037 A1 * | 10/2007 | Ichikawa | G11B 25/043 360/97.18 |

(Continued)

*Primary Examiner* — Jefferson A Evans
(74) *Attorney, Agent, or Firm* — Westman, Champlin & Koehler, P.A.

(57) ABSTRACT

A breather filter for reducing water in a data storage device housing includes an outer layer, an inner layer, and an intermediary layer positioned between the inner and outer layers. The outer layer includes an outer layer of hydrophilic material. The inner layer includes at least one of an inner layer of hydrophobic material and an inner layer of hydrophilic material. The intermediary layer includes a water adsorbing material, and fibers that promote water permeation from the inner layer to the outer layer.

20 Claims, 5 Drawing Sheets

(56) References Cited

U.S. PATENT DOCUMENTS

| | | | |
|---|---|---|---|
| 2007/0283809 A1* | 12/2007 | Boulay | B03C 3/30 |
| | | | 96/15 |
| 2008/0226534 A1 | 9/2008 | Gidumal et al. | |
| 2009/0065436 A1* | 3/2009 | Kalayci | B01D 39/1623 |
| | | | 210/679 |
| 2009/0116141 A1 | 5/2009 | Brown | |
| 2010/0321821 A1 | 12/2010 | Iwase | |
| 2012/0204722 A1* | 8/2012 | Watkins | B03C 3/017 |
| | | | 96/55 |
| 2013/0044392 A1* | 2/2013 | Brown | G11B 25/043 |
| | | | 360/97.16 |
| 2016/0022853 A1* | 1/2016 | Hajime | A61L 2/07 |
| | | | 206/370 |
| 2017/0352936 A1* | 12/2017 | Jin | H01M 12/06 |
| 2018/0111074 A1* | 4/2018 | Tuma | B32B 37/12 |
| 2018/0282923 A1* | 10/2018 | Carlyle | D04H 3/016 |

\* cited by examiner

DATA STORAGE DEVICE FILTER

BACKGROUND

Data storage devices, such as disc drives, are used to store digital data to a recording medium. Typically, the recording medium (e.g., disc medium) and circuitry for operating the data storage device are contained in a protective housing. Operation of such data storage devices may be adversely affected from high internal water vapor concentration and air contaminants within the housing.

SUMMARY

Embodiments of the present disclosure generally relate to a breather filter for reducing water in a data storage device housing, and a data storage device that includes the breather filter. Some embodiments of the breather filter include an outer layer, an inner layer, and an intermediary layer positioned between the inner and outer layers. The outer layer includes an outer layer of hydrophilic material. The inner layer includes at least one of an inner layer of hydrophobic material and an inner layer of hydrophilic material. The intermediary layer includes a water adsorbing material, and fibers that promote water permeation from the inner layer to the outer layer.

Embodiments of the data storage device include a data storage medium, a housing, and a breather filter. The housing has an interior chamber containing the data storage medium, and includes a breather hole that is open to the interior chamber. The breather filter is positioned within the interior chamber of the housing adjacent the breather hole. The breather filter includes an outer layer, an inner layer, and an intermediary layer positioned between the inner and outer layers. The outer layer faces the breather hole and includes an outer layer of hydrophilic material. The inner layer includes at least one of an inner layer of hydrophobic material and an inner layer of hydrophilic material. The intermediary layer includes a water adsorbing material, and fibers. The fibers of the intermediary layer promote permeation of water from the inner layer to the outer layer for expulsion of the water through the breather hole.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
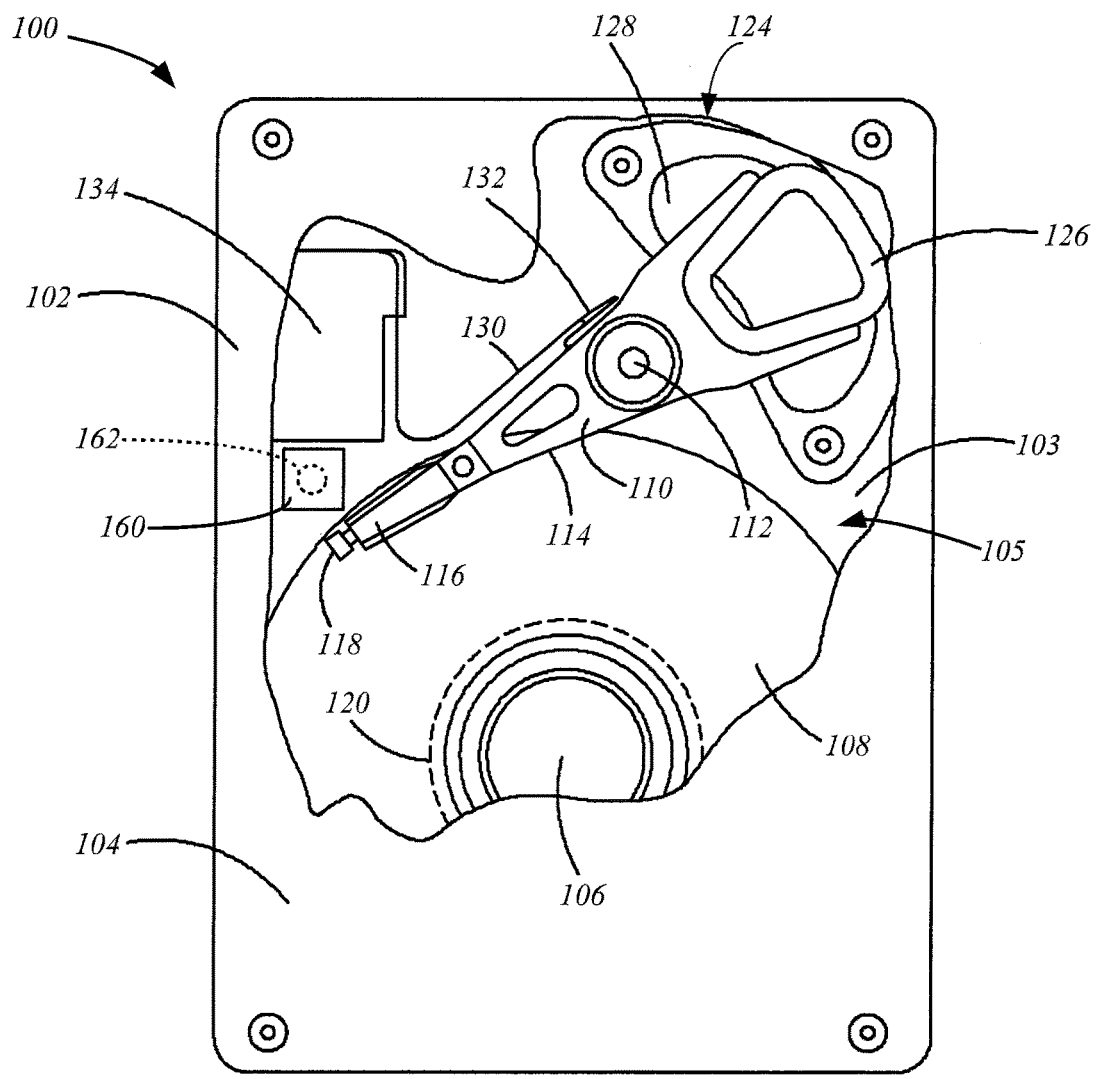
FIG. 1 is a top view of an exemplary data storage device, in which embodiments of the present disclosure may be implemented.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Data storage devices store and retrieve computerized data in a fast and efficient manner. Some data storage devices, such as hard disc drives (HDDs) store data in the form of tracks on one or more rotatable data storage media (e.g., discs). A data read/write transducer (e.g., sensor) can be positioned adjacent the tracks using an actuator assembly to read back data stored to the media, and write data to the media.

FIG. 1 is a top view of an exemplary data storage device 100 in the form of a disc drive, in which embodiments of the present disclosure may be implemented. The device 100 includes a housing 102 having a base 103 to which various components of the device 100 are mounted or contained. A top cover 104 of the housing 102, shown partially cut away, cooperates with the base 103 to form an interior chamber 105 containing components of the device 100.

A spindle motor 106 of the device 100 rotates one or more data discs 108. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 that extend toward the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

During a seek operation, the track position of the heads 118 may be controlled through the use of a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126, so that the coil 126 moves in accordance with the well-known Lorentz relationship. As the coil 126 moves, the actuator assembly 110 pivots about the bearing shaft assembly 112, and the heads 118 are caused to move across the surfaces of the discs 108. The heads 118 are positioned over one or more tracks 120 containing data and servo information for controlling the position of the heads 118.

A flex assembly 130 provides the requisite electrical connection paths for the actuator assembly 110, while allowing pivotal movement of the actuator assembly 110 during operation. The flex assembly may include a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation, and a preamplifier for amplifying read signals generated by the heads 118 during a read operation. The flex assembly terminates at a flex bracket 134 for communication through the base 103 to a disc drive printed circuit board (not shown) mounted to the bottom side of the disc drive 100.

Figure 2:
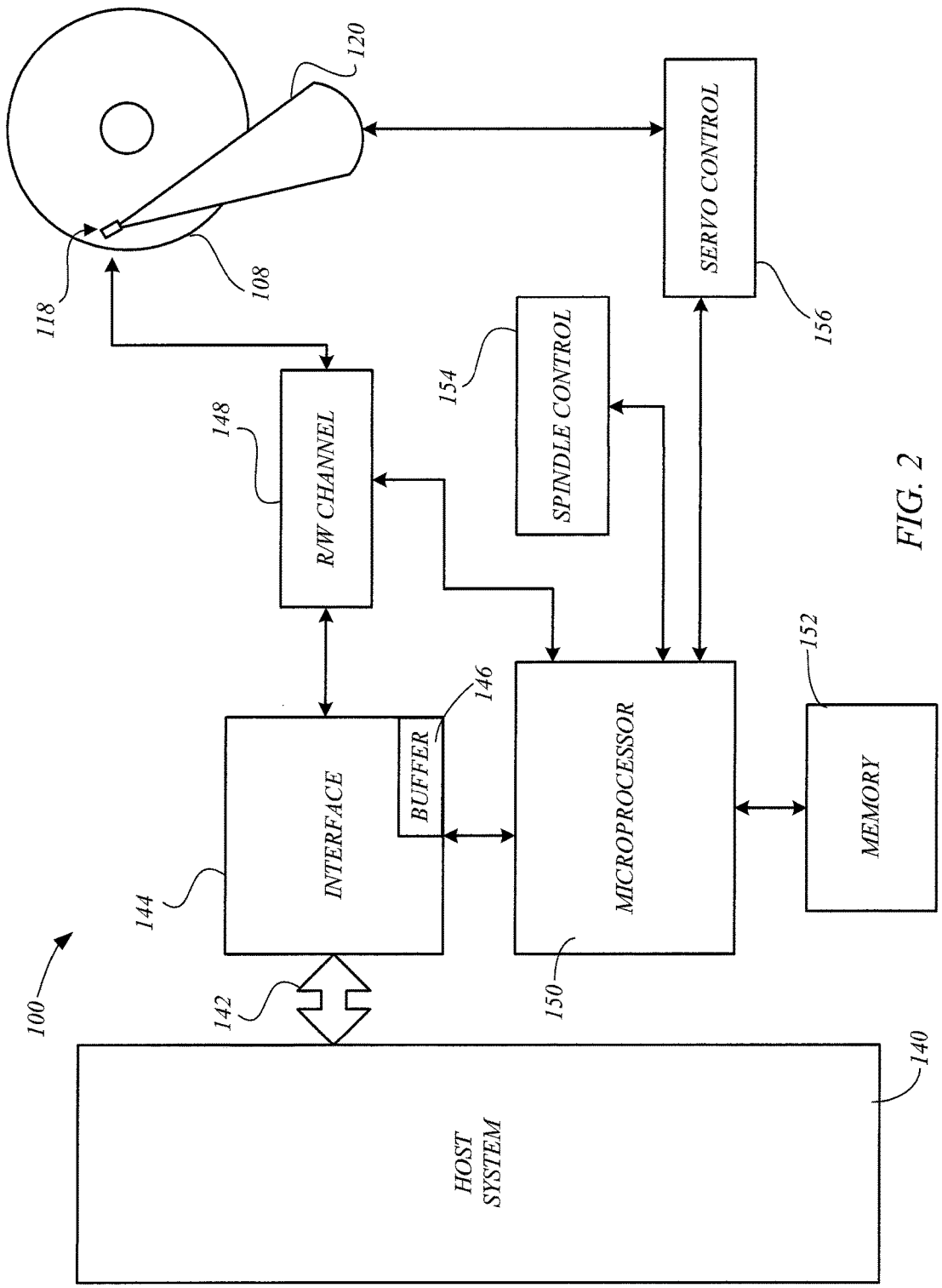
FIG. 2 is a simplified diagram of an exemplary data storage device, in accordance with embodiments of the present disclosure.

FIG. 2 is a simplified diagram of the exemplary data storage device 100 of FIG. 1, and generally shows the exemplary processing circuitry for controlling the operation of the device 100, which may be resident, for example, on a disc drive printed circuit board within the housing 102. A host system 140 may be operably connected 142 to an interface 144, such as an application specific integrated circuit. The interface 144 typically includes one or more associated buffers 146 that facilitates high speed data transfer between the host system 140 and the device 100.

Each buffer 146 may be a cache memory for caching commands and/or data to reduce disc access time, and include volatile and non-volatile memory. Data to be written to the device 100 are passed from the host system 140 to the interface 144, and then to a read/write channel 148, which encodes and serializes the data, and provides the requisite write current signals to write transducers of the heads 118. To retrieve data that has been previously stored by the device 100, read signals generated by one or more of the read transducers of the heads 118 are provided to the read/write channel 148, which performs decoding, error detection and correction operations, and outputs the retrieved data to the interface 144 for subsequent transfer to the host system 140.

As also shown in FIG. 2, a microprocessor 150 is operably connected to the interface 144. The microprocessor 150 provides top level communication and control for the device 100 in conjunction with programming for the microprocessor 150, which may be stored in a non-volatile memory 152 that is accessible by the microprocessor 150. The memory 152 may include random access memory (RAM), read only memory (ROM), and/or other sources of resident memory for the microprocessor 150. Additionally, the microprocessor 150 provides control signals for a spindle control 154, which controls the spindle motor 106 (FIG. 1), and a servo control system 156, which controls the currents to the VCM 128.

As the disc 108 rotates, the data head 118 reads the servo information from a corresponding disc 108, and sends the servo information back to servo control system 156. The servo control system 156 checks whether the address in the servo information corresponds to the desired track location for the head 118. If the address does not correspond to the desired head location, the servo control system 156 adjusts the position of the head 118 to the correct track location. When the head 118 is properly positioned, a read or write operation may be performed.

Data storage devices need to work in highly humid environments. Unfortunately, water can adversely affect a data storage device. For example, water in the housing 108 of the device 100 in the form of the disc drive of FIG. 1 can affect the height positioning of the heads 118 over their corresponding disc 108, which can impact error rates. Additionally, water can shorten the life of near-field transducers, such as those used in heat-assisted magnetic recording hard disc drives.

Figure 3:
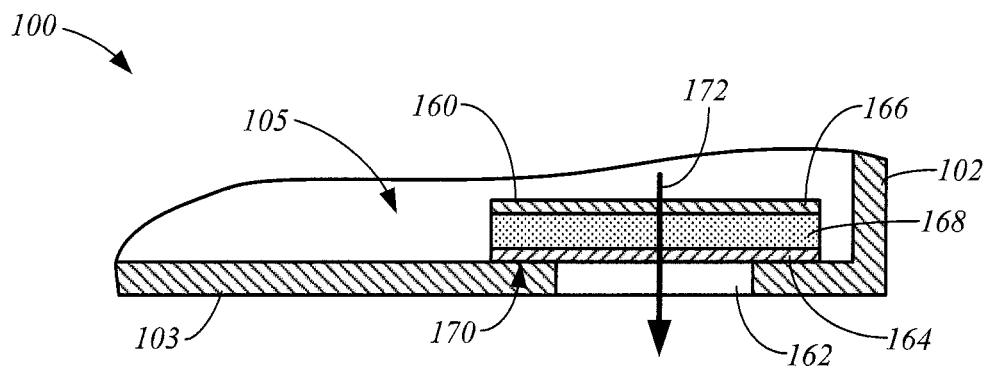
FIG. 3 is a simplified cross-sectional view of a portion of a data storage device, in accordance with embodiments of the present disclosure.

Embodiments of the present disclosure are directed to a breather filter 160, that operates to reduce the water in the interior of the housing 102 of a data storage device 100, such as the exemplary device 100 shown in FIG. 1. In some embodiments, the filter 160 is positioned within the interior chamber 105 of the housing 102, as shown in FIG. 1 and FIG. 3, which is a simplified cross-sectional view of a portion of a data storage device 100 in accordance with embodiments of the present disclosure. In some embodiments, the filter 160 is positioned adjacent to (e.g., over) a breather hole 162 of the housing 102, as indicted in FIG. 1. The breather hole 162 may be an opening through the base 103 or another wall of the housing 102, such as a side wall or the cover 104, for example.

Some embodiments of the filter 160 include an outer layer 164, an inner layer 166 and an intermediary layer 168, which is sandwiched between the layers 164 and 166. The outer layer 164 may be exposed to the breather hole 162. For example, the filter 160 may be attached to an interior side of the housing 102 adjacent the breather hole 162 to position such that the outer layer 164 faces the breather hole. For example, an exterior surface 170 of the layer 164 may be placed over the breather hole 162, as shown in FIG. 3. Thus, the outer layer 164 faces the breather hole 162. The filter 160 may be attached to the housing 102 using any suitable technique, such as by adhering the filter 160 to the housing 102, containing the filter within a supporting structure that is attached to the housing 102, or through another suitable technique.

In some embodiments, the layers 164, 166 and 168 of the filter 160 operate to reduce the rate at which water enters the housing 102 through the breather hole 162, and/or promote expulsion of water from the interior 105 of the housing 102 through the breather hole 162, as indicated by arrow 172 in FIG. 3. In addition to controlling water as discussed below, the filter 160 may be used to filter airborne contaminants.

Figure 4:
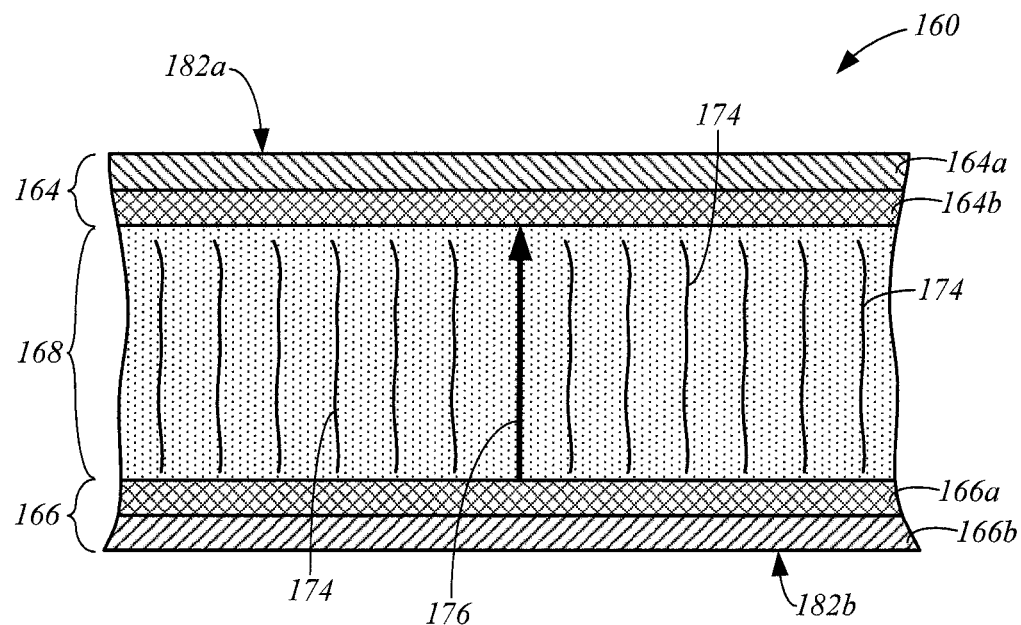
FIG. 4 is a simplified cross-sectional view of a portion of a breather filter, in accordance with embodiments of the present disclosure.
Figure 5A:
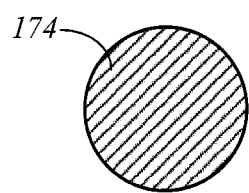
FIGS. 5A-D are cross-sectional views of exemplary fibers of a layer of a breather filter, in accordance with embodiments of the present disclosure.
Figure 5B:
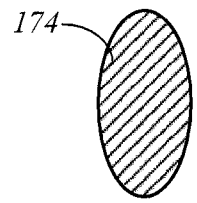
Figure 5C:
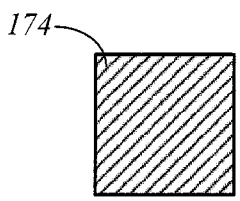
Figure 5D:
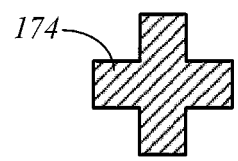

FIG. 4 is a simplified cross-sectional view of a portion of a breather filter 160 in accordance with embodiments of the present disclosure. In some embodiments, the outer layer 164 includes a hydrophilic material, such as a layer 164a of hydrophilic material, and/or a hydrophobic material, such as a layer 164b of hydrophobic material. Thus, embodiments of the outer layer 164 include a single layer 164a of hydrophilic material (e.g., without layer 164b), a single layer 164b of hydrophobic material (e.g., without layer 164a), and/or a combination of the layers 164a and 164b. In some embodiments, the hydrophobic layer 164b is between the intermediary layer 168 and the hydrophilic layer 164a, as shown in FIG. 4. In some embodiments, the hydrophilic layer 164a is between the intermediary layer 168 and the hydrophobic layer 164b.

Embodiments of the inner layer 166 include a hydrophobic material, such as a layer 166a of hydrophobic material, and/or a hydrophilic material, such as a layer 166b of hydrophilic material. Thus, embodiments of the inner layer 166 include a single layer 166a of hydrophobic material (e.g., without layer 166b), a single layer 166b of hydrophilic material (e.g., without layer 166a), and/or a combination of the layers 166a and 166b (FIG. 4). In some embodiments, the hydrophilic layer 166a is between the intermediary layer 168 and the hydrophilic layer 166b, as shown in FIG. 4. In some embodiments, the hydrophobic layer 166b is between the intermediary layer 168 and the hydrophilic layer 166a.

The intermediary layer 168 acts as a spacer layer between the layers 164 and 166. In some embodiments, the layer 168 includes a water adsorbing or absorbing material, such as, for example, activated carbon, or another water adsorbing or absorbing material. The layer 168 may also include fibers 174, which may promote water permeation from the inner layer 166 to the outer layer 164, as indicated by arrow 176, and expulsion of water from the interior 105 of the housing to the exterior through the breather hole 162. The fibers 174 may be formed of a hydrophobic material.

The hydrophilic and hydrophobic properties of the materials used to form the layers 164 and 166, as well as the pore size of the hydrophobic material, may be selected to provide the desired resistance to water entering the housing 102, and expulsion of water from within the housing 102 through the breather hole 162. Any suitable hydrophobic material may be used to form the layers 164b and 166a, and the fibers 174. For example, the hydrophobic material may include fluoropolymers, a synthetic polymer, polyester, and/or another suitable hydrophobic material. The hydrophobic material or materials of the layers 164b and 166a may also be in the form of fibers.

Any suitable hydrophilic material may be used for the layers 164a and 166b. For example, the hydrophilic material may include nylon, polyamide, polycarbonate, polyethersulfone, polyvinylidene, difluoride regenerated cellulose, cellulose nitrate, cellulose ocetate, anopore, mixed cellulose ester, and/or another suitable hydrophilic material. The hydrophilic material may also be in the form of fibers.

In some embodiments, the fibers 174 of the layer 168 promote transportation and permeation of water from the layer 166 to the layer 164, such as through wicking, as indicated by arrow 176. When the layer 168 is in the form of a spacer fabric having the fibers 174, the water permeation speed from the inner layer 166 to the outer layer 164 can be increased by adjusting the cross-sectional geometry (shape and size) of the fibers 174, the hydrophobicity of the material forming the fibers 174, and/or a knitting pattern of the fibers 174.

For example, the fibers 174 of the layer 168 may have a cross-sectional shape to provide a desired wicking property, by affecting the surface area as well as surface tension of the fiber material. Exemplary cross-sectional shapes of fibers 174 of the hydrophobic material in the layer 168 are shown in FIGS. 5A-D. In some embodiments, the cross-sectional shapes of the fibers 174 may be round (FIG. 5A), oval (FIG. 5B), polygonal (e.g., rectangular, pentagonal, hexagonal, etc.) (FIG. 5C), cruciform (FIG. 5D), and/or another suitable cross-sectional shape. Here, the cruciform fiber 174 (FIG. 5D) will generally provide a higher wicking speed than round fiber 174 (FIG. 5A), for example.

Figure 6A:
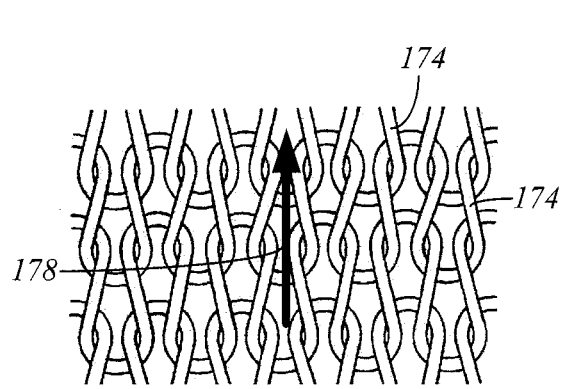
FIGS. 6A-B respectively show top views of an exemplary warp knitting and an exemplary weft knitting of fibers of a layer of a breather filter, in accordance with embodiments of the present disclosure.
Figure 6B:
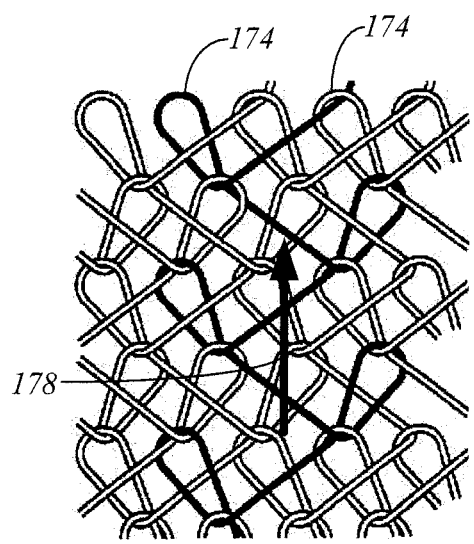

In some embodiments, the fibers 174 of the layer 168 are woven or knitted together in a manner that promotes the permeation of water from the layer 166 to the layer 164. In some embodiments, the fibers 174 are warp knitted or weft knitted, as respectively illustrated in FIGS. 6A and 6B, for example. In some embodiments, a wale direction 178 of the knitted fibers 174 is oriented to point from the inner layer 166 to the outer layer 164 to promote the permeation and wicking of water through the layer 168 from the layer 166 to the layer 164.

Figure 7A:
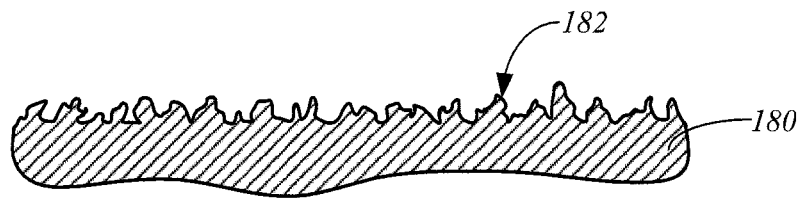
FIGS. 7A-D are cross-sectional views of a layer of a breather filter illustrating various treatments, in accordance with embodiments of the present disclosure.
Figure 7B:
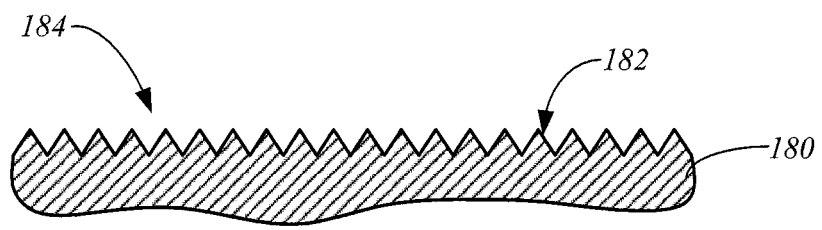

In some embodiments, the hydrophilic material used to form the layer 164a and/or the layer 166b is processed or treated to enhance the hydrophility of the corresponding layers 164a or 166b. FIGS. 7A-D illustrate an exemplary hydrophilic layer 180, which may represent the hydrophilic layers 164a or 166b, that is configured or treated to have enhanced hydrophility. In some embodiments, the hydrophility of the layer 180 is enhanced by roughening at least an exterior surface 182, as shown in FIG. 7A. The surface 182 may correspond to the surface 182a of the layer 164a and/or the surface 182b of the layer 166b, which are shown in FIG. 4. This increases the surface area of the surface 182, and increases the hydrophility of the layer 180. The surface 182 may be roughened through abrasion or other suitable technique. In some embodiments, a textured pattern 184 is formed on the surface 182 that provides the desired roughness, such as illustrated in FIG. 7B. In some embodiments, at least the surface 182 of the layer 180 is processed to have a roughness of approximately (e.g., ±15%) greater than 1 μm (Ra), such as 1-5 μm (Ra), for example.

Figure 7C:
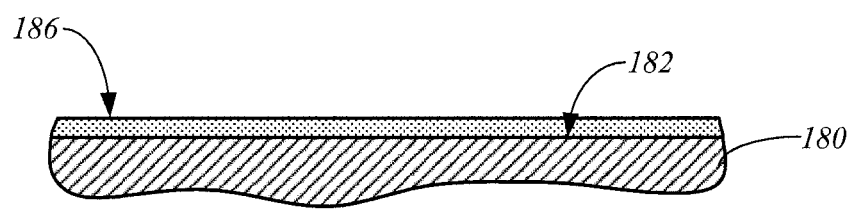

In some embodiments, the processing of at least the exterior surface 182 of the layer 180 includes applying a treatment 186 to at least the surface 182 that improves the hydrophility of the layer 180, as shown in FIG. 7C. In some embodiments, the treatment 186 includes a coating of material. Exemplary embodiments of the coating material forming the treatment 186 include titanium oxide, ruthenium (Ru), rhodium (Rh), palladium (Pd), silver (Ag), osmium (Os), iridium (Ir), platinum (Pt), gold (Au), copper (Cu), titanium (Ti), niobium (Nb), tantalum (Ta), and/or another suitable hydrophility-enhancing coating. The coating treatment 186 may be applied to the surface 182 using any suitable technique, such as blade coating, dip coating, chemical deposition, or another suitable technique.

In some embodiments, the treatment 186 to the layer 180 includes processing at least the surface 182 of the layer 180 to include one or more hydrophilic chemical bonds. Exemplary hydrophilic chemical bonds that may be formed on or in the layer 180 include hydroxyl, peroxy, carbonyl, carbonate, ether, ester, carboxylic acid, sulfonyl and sulfonyl hydroxide groups. Other hydrophilic chemical bonds may also be applied to the layer 180.

Figure 7D:
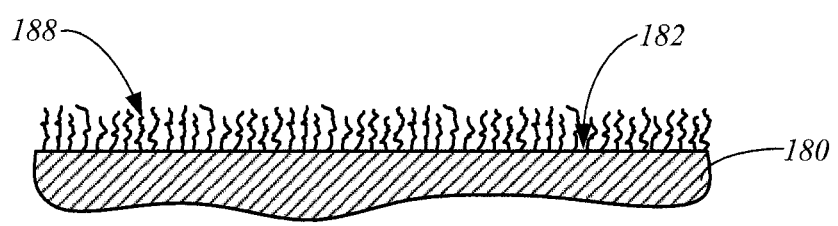

In some embodiments, the processing of the layer 180 includes processing at least the surface 182 to form one or more polar chemical graftings 188 on the surface 182, as shown in FIG. 7D. The polar chemical graftings 188 may be formed from carbonyl, hydroxyl, nitrogen-containing, and/or silicon-containing functional groups, or other suitable polar chemical grafting.

Some embodiments are directed to a method of using the filter 160, which is formed to include one or more embodiments described herein, in a data storage device 100. In some embodiments, the filter 160 is positioned within the interior chamber 105 of a housing 102 of the data storage device 100, as shown in FIGS. 1 and 3. The housing 102 contains components of the data storage device 100, such as a data storage medium (e.g., one or more data storage discs 108), circuitry, and/or other components. In some embodiments, the housing 102 includes a breather hole 162, and the filter 160 is positioned with the outer layer 164 exposed to (e.g., facing) the breather hole 162, as shown in FIG. 3. The fibers 174 of the intermediary layer 168 promote permeation of water from the inner layer 166 to the outer layer 164. The filter 160 resists water entering the housing 102 through the breather hole, and promotes the expulsion of water from the interior chamber 105 through the breather hole 162. This results in a lower amount of water in the housing 102 than would otherwise be present if the filter 160 was not used. As a result, the breather filter 160 can be used to improve the lifespan and performance of data storage devices.

Although the embodiments of the present disclosure have been described with reference to preferred embodiments, workers skilled in the art will recognize that changes may be made in form and detail without departing from the spirit and scope of the present disclosure.

What is claimed is:

1. A breather filter for reducing water in a data storage device housing, the breather filter comprising:
   an outer layer comprising an outer layer of hydrophilic material;
   an inner layer comprising at least one of an inner layer of hydrophobic material and an inner layer of hydrophilic material; and
   an intermediary layer between the inner and outer layers, the intermediary layer comprising a water adsorbing material, and fibers having a cross-sectional geometry or a knitting pattern that promotes water permeation from the inner layer to the outer layer.

2. The breather filter according to claim 1, wherein the inner layer comprises the inner layer of hydrophobic material.

3. The breather filter according to claim 2, wherein the inner layer comprises the inner layer of hydrophilic material.

4. The breather filter according to claim 3, wherein the inner layer of hydrophilic material is between the inner layer of hydrophobic material and the intermediary layer.

5. The breather filter according to claim 1, wherein the outer layer comprises an outer layer of hydrophobic material.

6. The breather filter according to claim 5, wherein the outer layer of hydrophobic material is between the outer layer of hydrophilic material and the intermediary layer.

7. The breather filter according to claim 6, wherein the inner layer comprises the inner layer of hydrophobic material.

8. The breather filter according to claim 7, wherein the inner layer comprises the inner layer of hydrophilic material.

9. The breather filter according to claim 1, wherein at least one of the outer layer of hydrophilic material and the inner layer of hydrophilic material includes:
   an approximate exterior surface roughness ($R_a$) of greater than 1 μm;
   a textured pattern on an exterior surface;
   a coating of one or more materials on an exterior surface selected from the group consisting of titanium oxide, ruthenium (Ru), rhodium (Rh), palladium (Pd), silver (Ag), osmium (Os), iridium (Ir), platinum (Pt), gold (Au), copper (Cu), titanium (Ti), niobium (Nb), and tantalum (Ta);
   one or more hydrophilic chemical bonds selected from the group consisting of hydroxyl, peroxy, carbonyl, carbonate, ether, ester, and carboxylic acid groups;
   one or more hydrophilic materials selected from the group consisting of nylon, polyamide, polycarbonate, polyethersulfone, polyvinylidene, difluoride regenerated cellulose, cellulose nitrate, cellulose ocetate, and anopore; or
   one or more polar chemical graftings selected from the group consisting of carbonyl, hydroxyl, nitrogen-containing, and silicon-containing functional groups.

10. The breather filter according to claim 1, wherein the fibers of the intermediary layer are knitted and a wale direction of the knitted fibers points from the interior layer toward the outer layer.

11. The breather filter according to claim 10, wherein at least one of the inner layer of hydrophobic material and the fibers of the intermediary layer comprise a hydrophobic material selected from the group consisting of fluoropolymers, a synthetic polymer, and polyester.

12. The breather filter according to claim 11, wherein the fibers of the intermediary layer have a cross-sectional shape selected from the group consisting of round, oval, polygonal, and cruciform.

13. The breather filter according to claim 1, wherein the water adsorbing material comprises activated carbon.

14. A data storage device comprising:
    a data storage medium;
    a housing having an interior chamber containing the data storage medium, and including a breather hole that is open to the interior chamber; and
    a breather filter within the interior chamber of the housing adjacent the breather hole, the breather filter comprising:
       an outer layer comprising an outer layer of hydrophilic material facing the breather hole;
       an inner layer comprising at least one of an inner layer of hydrophobic material and an inner layer of hydrophilic material; and
       an intermediary layer between the inner and outer layers, the intermediary layer comprising a water adsorbing material, and fibers:
    the fibers of the intermediary layer comprise a knitting pattern that promotes permeation of water from the inner layer to the outer layer for expulsion of the water through the breather hole.

15. The data storage device according to claim 14, wherein the outer layer comprises an outer layer of hydrophobic material between the outer layer of hydrophilic material and the intermediary layer.

16. The data storage device according to claim 15, wherein:
    the inner layer comprises the inner layer of hydrophobic material and the inner layer of hydrophilic material; and
    the inner layer of hydrophilic material is between the inner layer of hydrophobic material and the intermediary layer.

17. The data storage device according to claim 16, wherein at least one of the outer layer of hydrophilic material and the inner layer of hydrophilic material includes:
    an approximate exterior surface roughness ($R_a$) of greater than 1 μm;
    a textured pattern on an exterior surface;
    a coating of one or more materials on an exterior surface selected from the group consisting of titanium oxide, ruthenium (Ru), rhodium (Rh), palladium (Pd), silver (Ag), osmium (Os), iridium (1r), platinum (Pt), gold (Au), copper (Cu), titanium (Ti), niobium (Nb), and tantalum (Ta);
    one or more hydrophilic chemical bonds selected from the group consisting of hydroxyl, peroxy, carbonyl, carbonate, ether, ester, and carboxylic: acid groups;
    one or more hydrophilic materials selected from the group consisting of nylon, polyamide, polycarbonate, polyethersulfone, polyvinylidene, difluoride regenerated cellulose, cellulose nitrate, cellulose ocetate, and anopore; or
    one or more polar chemical graftings selected from the group consisting of carbonyl, hydroxyl, nitrogen-containing, and silicon-containing functional groups.

18. The data storage device according to claim 16, wherein the fibers of the intermediary layer are knitted and a wale direction of the knitted fibers points from the interior layer toward the outer layer.

19. A method of making a breather filter for reducing water in a data storage device housing, the method comprising:
- forming an outer layer comprising an outer layer of hydrophilic material;
- forming an inner layer comprising at least one of an inner layer of hydrophobic material and an inner layer of hydrophilic material; and
- forming an intermediary layer between the inner and outer layers, the intermediary layer comprising a water adsorbing material, and fibers having a cross-sectional geometry or a knitting pattern that promotes water permeation from the inner layer to the outer layer.

20. The method of claim 19 and further comprising providing a layer of hydrophobic material is between the outer layer of hydrophilic material and the intermediary layer.

* * * * *